(12) United States Patent
Bamba et al.

(10) Patent No.: US 7,917,705 B2
(45) Date of Patent: Mar. 29, 2011

(54) SCALABLE PERFORMANCE-BASED VOLUME ALLOCATION IN LARGE STORAGE CONTROLLER COLLECTIONS

(75) Inventors: Bhuvan Bamba, Larchmont, NY (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 11/750,076

(22) Filed: May 17, 2007

(65) Prior Publication Data

US 2008/0288739 A1    Nov. 20, 2008

(51) Int. Cl.
 *G06F 12/00* (2006.01)
(52) U.S. Cl. ............... 711/148; 711/E12.077
(58) Field of Classification Search .............. 711/148; 718/100–105
See application file for complete search history.

(56) References Cited

U.S. PATENT DOCUMENTS

| | | | |
|---|---|---|---|
| 6,247,077 B1 | 6/2001 | Muller et al. | |
| 2005/0183087 A1* | 8/2005 | Kubota | 718/100 |
| 2006/0136684 A1 | 6/2006 | Le et al. | |
| 2006/0200400 A1 | 9/2006 | Hunter et al. | |
| 2007/0271570 A1* | 11/2007 | Brown et al. | 718/105 |

FOREIGN PATENT DOCUMENTS

| | | |
|---|---|---|
| EP | 1533699 | 5/2005 |
| WO | WO 00/31640 | 6/2000 |

OTHER PUBLICATIONS

Coffman, E. G. et al., "Approximation Algorithms for Bin Packaging Survey," Approximation Algorithms for NP-Hard Problems, Jan. 1, 1996, pp. 1-53.
Comer, D., "The Ubiquitous B. Tree," ACM Computing Surveys, ACM, New York, NY, V11, N2, Jun. 1, 1979, pp. 121-137.
Krupnova, Helena et al., "Hierarchical Interactive Approach to Partition Large Designs into FPGAs", Lecture Notes in Computer Science: LNCS, V1673 Jun. 19, 2004, pp. 101-111.
Seeger, B. et al., "Muti-Disk B-Trees*", Sigmond Record, ACM, new York, NY, V20, No. 2, Jun. 1, 1991, pp. 436-445.
PCT/EP2008/055991 International Search Report.

* cited by examiner

*Primary Examiner* — Reginald G Bragdon
*Assistant Examiner* — Hamdy S Ahmed
(74) *Attorney, Agent, or Firm* — Canady & Lortz LLP; Bradley K. Lortz

(57) ABSTRACT

A scalable, performance-based, volume allocation technique that can be applied in large storage controller collections is disclosed. A global resource tree of multiple nodes representing interconnected components of a storage system is analyzed to yield gap values for each node (e.g., a bottom-up estimation). The gap value for each node is an estimate of the amount in GB of the new workload that can be allocated in the subtree of that node without exceeding the performance and space bounds at any of the nodes in that subtree. The gap values of the global resource tree are further analyzed to generate an ordered allocation list of the volumes of the storage system (e.g., a top-down selection). The volumes may be applied to a storage workload in the order of the allocation list and the gap values and list are updated.

20 Claims, 10 Drawing Sheets

SCALABLE PERFORMANCE-BASED VOLUME ALLOCATION IN LARGE STORAGE CONTROLLER COLLECTIONS

BACKGROUND OF THE INVENTION

1. Field of the Invention

This invention relates to large computer storage controller collections. Particularly, this invention relates to performance-based volume allocation in a storage controller collection.

2. Description of the Related Art

Performance-based volume allocation is the task of determining where to allocate volumes for a workload based on the workload profile in terms of space and performance requirements and the current performance numbers at the various components of the storage controllers. This task becomes more challenging as the storage sizes keep increasing with an increasing number of disks per controller and an increasing number of controllers. Current single controller algorithms do not scale well with the increasing sizes and hence are not suitable for large dynamic storage control scenarios. Furthermore, conventional controller algorithms introduce large variances among system components.

Current storage controllers are sophisticated devices which can be modeled as a hierarchy of components where each component has its performance constraints. By modeling the storage controller as a hierarchy of components, i.e. a resource graph model, dependencies between the hardware components in a storage controller may be captured. The current space and performance numbers for each component are obtained to ensure that no component in the hierarchy is overloaded; overloading of a single component in the hierarchy can disrupt workloads assigned to the storage pools associated with the component. Workload profiles for new workloads may be used to predict the space and performance requirements for new workloads. Other factors such as minimum and maximum permissible or required logical volume sizes can also impact the workload assignment decision making process. The existing performance numbers along with the workload profiles and other factors mentioned above may be taken into account to determine suitable storage controller components for creating volumes for allocating the new workloads.

Conventional algorithms for storage volume allocation are too slow and do not scale well with increasing storage system sizes which makes them unsuitable for many large dynamic storage scenarios. Furthermore, the variance that they introduce among system components can be large, leading to heavy loads on some components in the storage controller resource hierarchy. Other greedy or random assignment algorithms lead to poor allocations resulting in unbalanced systems as they fail to consider load balancing for nodes higher in the resource graph hierarchy. As nodes higher in the resource graph hierarchy are responsible for larger number of workloads below them compared to nodes lower in the hierarchy, any overloading of these nodes can quickly lead to poor overall system performance. Some systems and methods have been developed in the area of storage control and resource allocation.

U.S. Patent Application Publication No. 2006/0200400 by Hunter et al., published Sep. 7, 2006, discloses an improved resource allocation system comprising a reliability decision engine, which allocates the portfolio's assets as required for the desired reliability portfolio. The reliability decision engine includes two reliability decision engines, a basic reliability decision engine and a robust reliability decision engine. The use of robust optimization makes it possible to determine the sensitivity of the optimized portfolio. Scenarios can be specified directly by the user or automatically generated by the system in response to a selection by the user. Inputs are applied to basic the basic reliability decision engine and inputs are applied to robust reliability decision engine.

U.S. Patent Application Publication No. 2006/0136684 by Le et al., published Jun. 22, 2006, discloses a method for preparing data units for access in a data storage system. The data storage system includes multiple storage devices having data units. All the storage devices of the data storage system are not powered on at the same time. The method includes preparing and storing the auxiliary data. The auxiliary data is prepared for a data unit on a storage device that will be powered off during an access request of the data unit. The auxiliary data is stored on the storage devices so that the auxiliary data is likely to be available on a powered-on storage device when the data unit is the subject of an access request.

U.S. Pat. No. 6,247,077 by Muller et al, published Jun. 12, 2001, discloses a highly-scalable parallel processing computer system architecture. The parallel processing system comprises a plurality of compute nodes for executing applications, a plurality of I/O nodes, each communicatively coupled to a plurality of storage resources, and an interconnect fabric providing communication between any of the compute nodes and any of the I/O nodes. The interconnect fabric comprises a network for connecting the compute nodes and the I/O nodes, the network comprising a plurality of switch nodes arranged into more than $g(\log_b N)$ switch node stages, wherein b is a total number of switch node input/output ports, and $g(x)$ indicates a ceiling function providing the smallest integer not less than the argument x, the switch node stages thereby providing a plurality of paths between any network input port and network output port.

In view of the foregoing, there is a need in the art for programs, methods and system to allocate storage volumes in a distributed storage system with improved performance. Further, there is a need for such programs, methods and systems to employ an algorithm for allocating volumes in large storage controller collections that is scalable and performance-based. These and other needs are met by the present invention as detailed hereafter.

SUMMARY OF THE INVENTION

Embodiments of the invention are derived from a scalable, performance-based, volume allocation technique that can be applied in large storage controller collections. Embodiments of the invention can be based on a combination of a bottom-up estimation process and a top-down selection process while maintaining correctness yielding a balanced load on all components of the system (at different hierarchical levels) during volume allocation. Thus, the algorithm ensures no system component is overloaded beyond its performance limits. A global resource tree of multiple nodes representing interconnected components of a storage system is analyzed to yield gap values for each node (this step proceeds in a bottom-up manner). The gap value for each node corresponds to a throughput limit for a non-leaf node or a capacity limit for a leaf node. The gap value for each node can comprise an estimate of the amount in GB of the new workload that can be allocated in the subtree of that node without exceeding the performance and space bounds at any of the nodes in that subtree. The gap values of the global resource tree are further analyzed to generate an ordered allocation list of the volumes of the storage system (this step proceeds in a top-down manner). The volumes may be allocated to a storage workload in the order of the allocation list; the gap values and list are updated.

A typical embodiment of the invention comprises a computer program embodied on a computer readable medium, including program instructions for determining a gap value for each node of a global resource tree for a storage system and program instructions for generating an ordered allocation list of volumes on a plurality of leaf nodes of the global resource tree of the storage system based on ordering the leaf nodes by the gap value for each of the leaf nodes. The gap value for each node corresponds to an estimate of a new workload amount that can be allocated in one or more subtree nodes of the node without exceeding performance and space limits of any of the subtree nodes of the node. The gap value for each node may be determined through a bottom-up estimation process across the global resource tree and the ordered allocation list of the volumes of the plurality of leaf nodes may be generated from a top-down selection process. Program instructions may also be included for updating the gap values and reordering the ordered allocation list after allocating a workload to at least a portion of the ordered allocation list of volumes of the global resource tree.

In further embodiments, determining the gap value for each node may comprise calculating a node-specific performance limit estimate. The node-specific performance limit estimate for each node can involve calculating a remaining performance capacity for each node. In this case, the remaining performance capacity is determined from a remaining utilization value divided by a nominal cost for each node, where the nominal cost comprises a performance utilization rate per space used in any associated descendent volume for each node.

In some embodiments of the invention, the gap value for each node can be determined as the lesser of the node-specific performance limit estimate for a parent node and a sum of the node-specific performance limit estimate for all child nodes for the parent node. Further, in some embodiments of the invention, any non-leaf child nodes of each node can be processed in a sorted order by decreasing gap values of the non-leaf child nodes. Alternately, any non-leaf child nodes of each node may be processed in a sorted order by a user-defined cost function.

In a similar manner, a typical method embodiment of the invention includes the steps of determining a gap value for each node of a global resource tree for a storage system and generating an ordered allocation list of volumes on a plurality of leaf nodes of the global resource tree of the storage system based on ordering the leaf nodes by the gap value for each of the leaf nodes. The gap value for each node corresponds to an estimate of a new workload amount that can be allocated in one or more subtree nodes of the node without exceeding performance and space limits of any of the subtree nodes of the node. Method embodiments of the invention may be further modified consistent with the programs and systems described herein.

Likewise, a typical storage system embodiment of the invention includes a hierarchy of interconnected storage components represented as a global resource tree comprising a plurality of nodes corresponding to the different interconnected storage components for the storage system, and a processor for determining a gap value for each node of the global resource tree and for generating an ordered allocation list of volumes on a plurality of leaf nodes of the global resource tree based on ordering the leaf nodes by the gap value for each of the leaf nodes. Here also, the gap value for each node corresponds to an estimate of a new workload amount that can be allocated in one or more subtree nodes of the node without exceeding performance and space limits of any of the subtree nodes of the node. Similarly, system embodiments of the invention may be further modified consistent with the programs and methods described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Placement of new workloads on storage controllers demands careful consideration of factors, such as available space and performance of the various components of the storage controller collection based on current workload. Current algorithms can prove to be inadequate in appropriately balancing the performance of the various components for a large storage controller collection. A new algorithm is provided for provisioning workload volumes on a plurality of storage controllers, taking into consideration the space and performance loads at the various components of the controllers. Experimentation indicates that the new algorithm can outperform existing algorithms in terms of balancing the load across various components of a storage controller collection, resulting in a faster, scalable mechanism for allocating volumes of data. The method when compared to the greedy, random and the state of the art methods can yield lower variances across system components (at different levels of the resource graph hierarchy) which is a measure of better quality. The new algorithm can be much faster than other known methods for solving the resource volume allocation problem. On average, the algorithm can be three to four times faster than previous state of the art methods. The speedups can be even higher (e.g., six to nine times) as the storage system sizes become larger. Thus, the method can provide a faster, scalable mechanism for performance based volume allocation with better quality.

Figure 1:
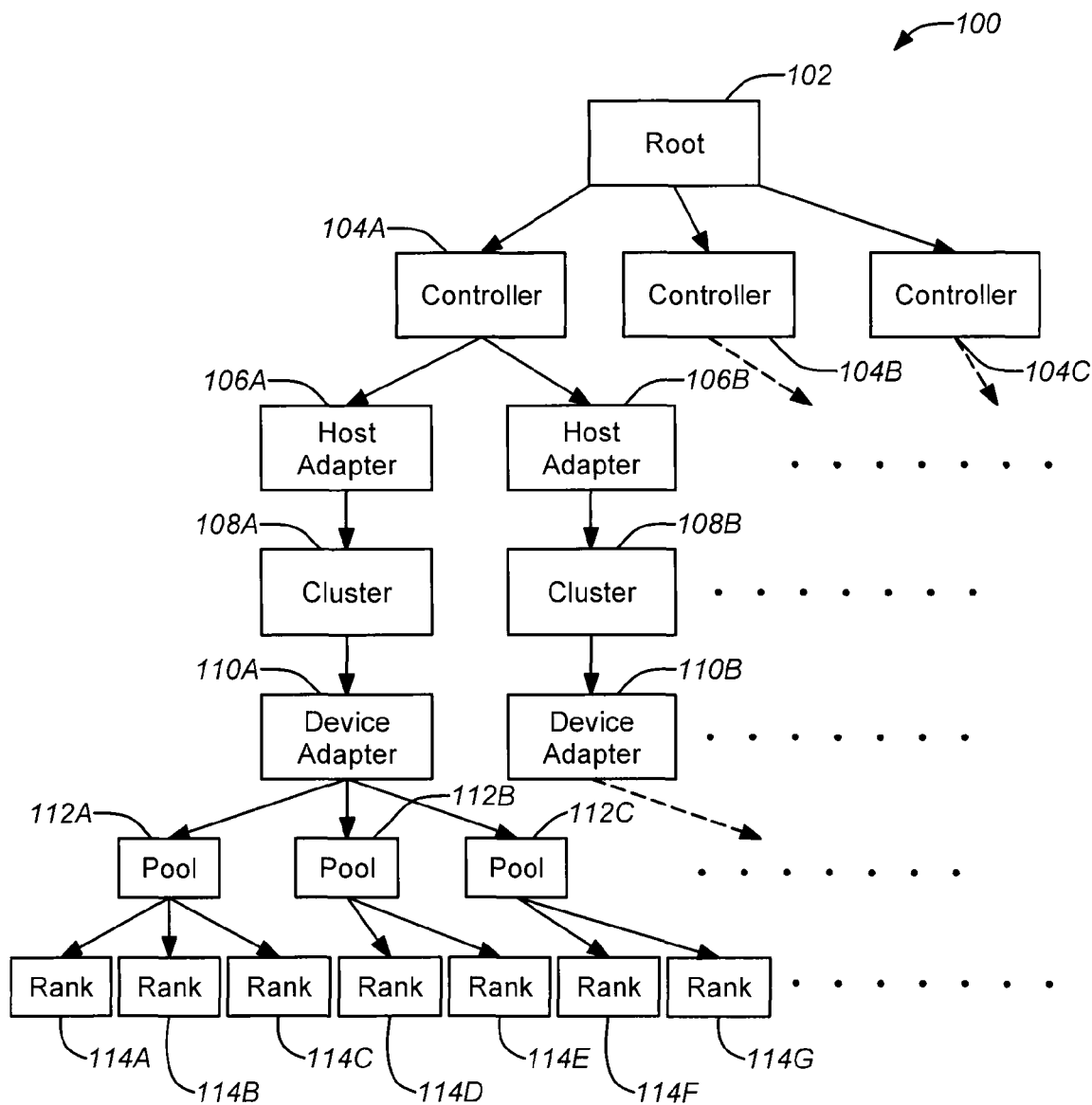
FIG. 1 illustrates an exemplary global resource graph visually representing a tree style hierarchy of the dependencies between various interconnected hardware elements of a storage system.

FIG. 1 illustrates an exemplary global resource graph 100, which visually represents a tree style hierarchy of the dependencies between the various interconnected hardware elements of a storage system. The node at the top of the global resource graph 100 tree structure is the root node 102, which has all of the controllers for the various storage components 104A, 104B and 104C, connected to it. The root node 102 is the central access point for all data into and out of the storage system represented by the global resource graph 100. The storage controllers 104A, 104B and 104C and the subtrees beneath each of them may be referred to as the controller resource graphs. Note that in the example only one complete branch of the global resource graph 100 is shown to the leaf nodes (ranks) at the bottom. It should also be noted that a leaf node (rank) may comprise one or more of the volumes to be allocated by the algorithm. The combination of the of the controller resource graphs under the common root node 102 form the global resource graph 100. In the example, the storage controller 104A is communicatively coupled to host adapters 105A and 105B, which connect the host system to the storage devices. The host adapter 105A is connected to the cluster 106A, which provides the management for the storage system. The cluster 106A is connected with the device adapter 107A, which provides communication between the cluster 106A and the storage devices 110A-110G. The storage pools 108A, 108B and 108C, identify which of the volumes, or storage devices, 110A-110G that should be managed by the controllers. It should noted that the global resource graph 100 depicted is only an example; different storage systems will be represented by different graphs as will be understood by those skilled in the art. For example, other systems may couple controllers to different numbers of host adapters and/or device adapters may oversee different numbers of pools and rank below them, depending upon the particular storage system architecture. Completely different architectures having different component layers may also be implemented with embodiments of the invention; the global resource graph 100 is used to capture generic performance characteristics of an interconnected arrangement of nodes without regard to the specific hardware or architecture as will be understood by those skilled in the art.

Embodiments of the invention may operate using two important processes, a bottom-up estimation process and a top-down selection process. The bottom-up estimation process is driven by the compilation of a global resource graph from the controller resource graphs used with the performance numbers from storage components. This construction of the global resource graph from controller resource graphs is also why the estimation process may be characterized as being bottom-up. Bottom-up constructions are those where smaller, more specific pieces of information are constructed together to form a larger picture of the system. This process is used to determine if all the children nodes can support as much load as the parent node. If the sum of the loads that all the child nodes can support is less than that which the parent node can support, the estimate for the parent node needs to be reduced to the estimate of the sum of the loads that its child nodes can support. The top-down selection process is based on the analysis of the bottom-up estimation. It is referred to as "top-down" because the algorithm traverses each level of the global resource graph and volumes are allocated in the last, most specific node of the graph.

2. Hardware Environment

Figure 2A:
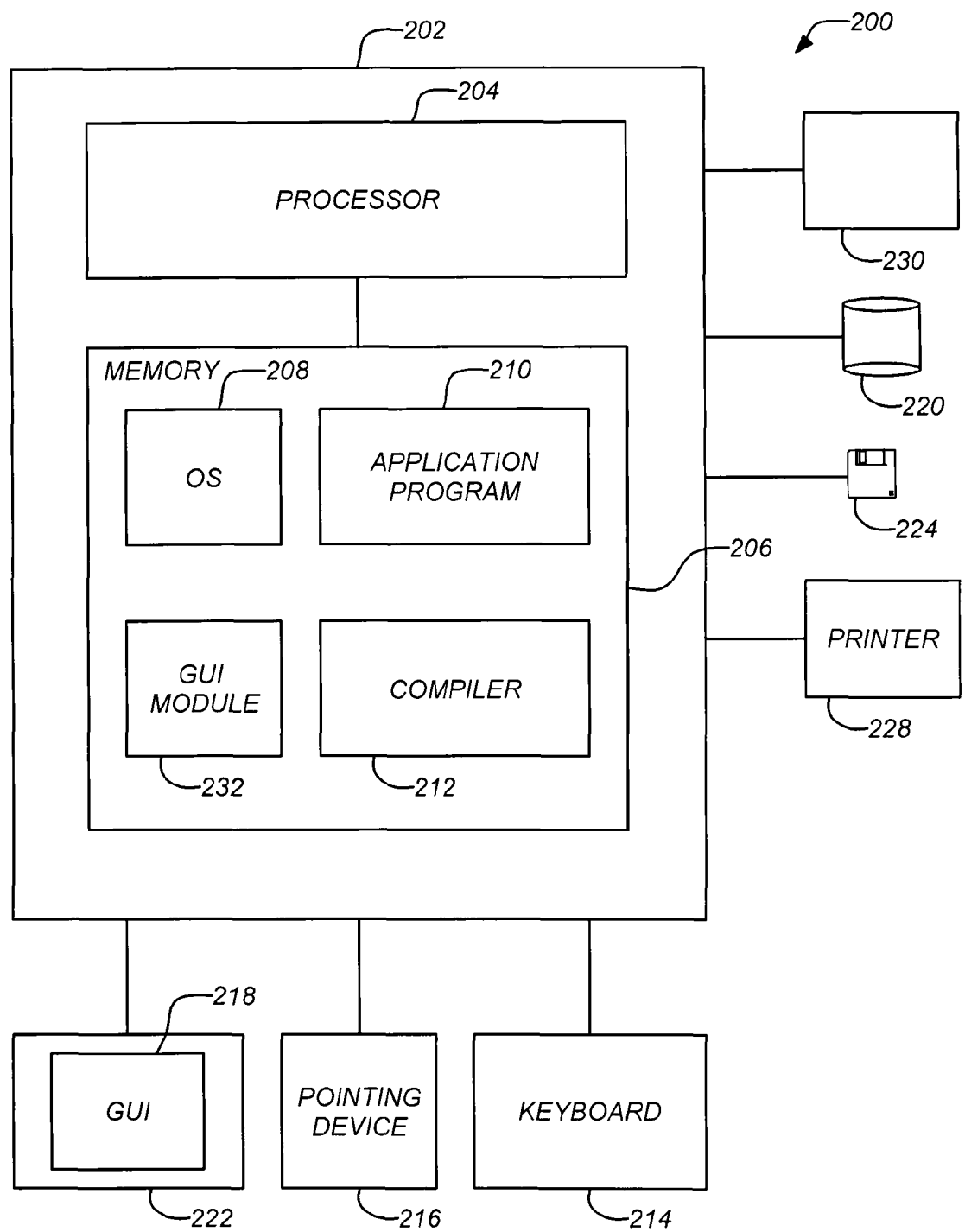
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to a software application program 210 that manages data objects (i.e., files) access to a storage system comprised of multiple separate storage devices. The program 210 may operate within a single computer 202 or as part of a distributed computer system comprising a network of computing and storage devices. The network may encompass one or more computer/storage devices connected via a local area network and/or Internet connection (which may be public or secure, e.g. through a VPN connection).

Figure 2B:
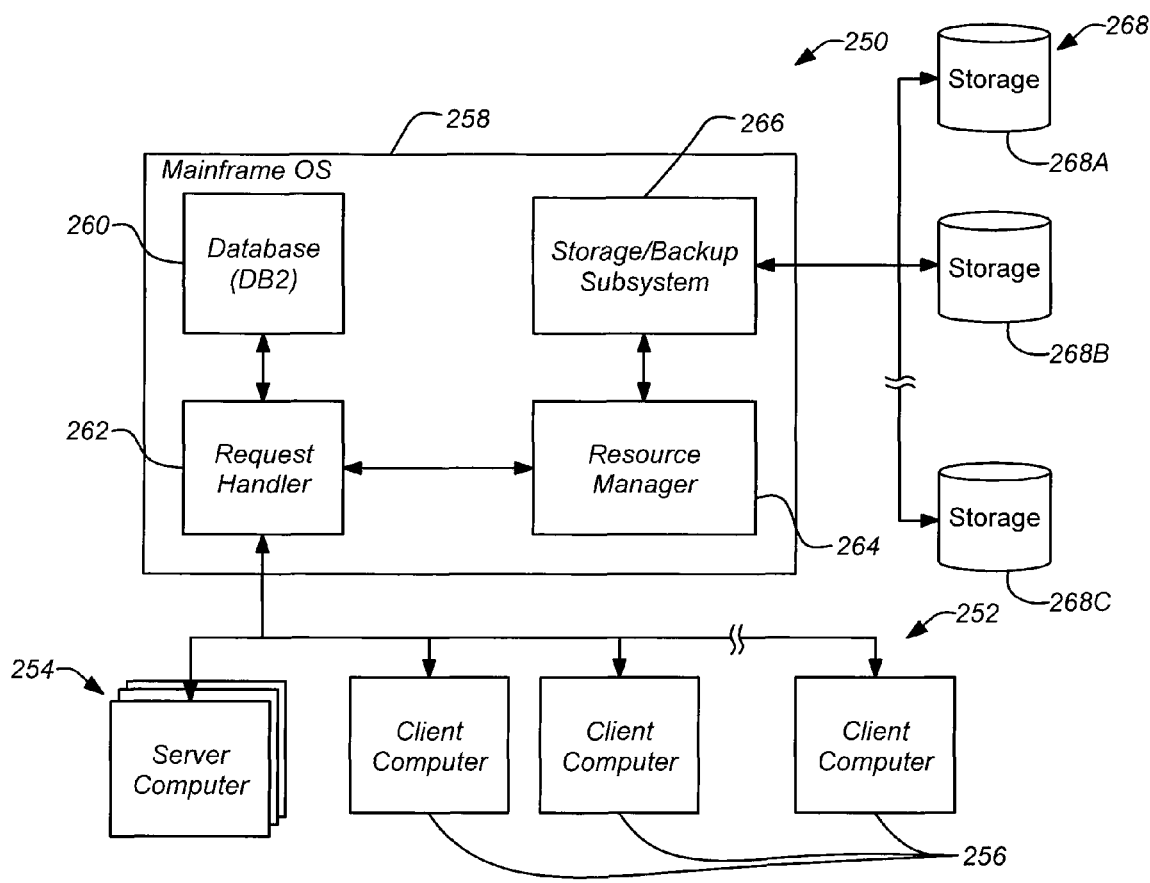
FIG. 2B illustrates a typical distributed computer system which may be employed in an typical embodiment of the invention.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

Figure 2C:
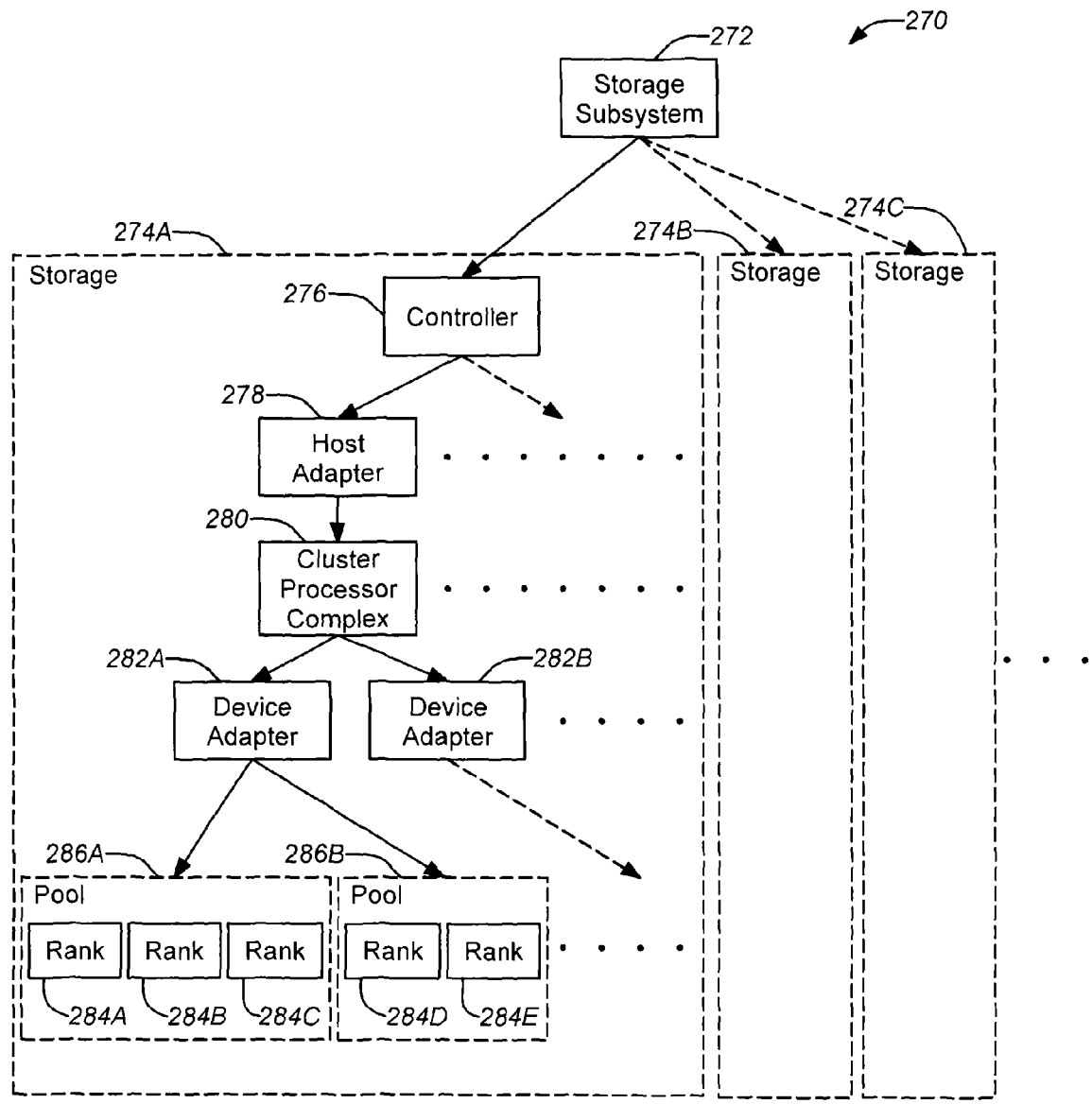
FIG. 2C illustrates a typical storage system implementing an embodiment of the invention.

FIG. 2C illustrates a typical storage system 270 implementing an embodiment of the invention. For example, the storage system 270 may operate as part of the storage/backup subsystem 266 and storage devices 268 in the distributed computer system 250 of FIG. 2B. A typical implementation of the invention comprises a program operating on the storage subsystem 272 (e.g., the storage/backup subsystem 266 of the computer 258 of FIG. 2B). The storage subsystem 272 is coupled to a plurality of storage devices 274A-274C. Although only one storage device 247A will be described in detail, it should be understood that other storage devices 274B, 274C may be similarly constituted. The controller 276 directs where data goes within the storage device 274A. The data is at least part of a storage workload coming through the storage subsystem 272. Typically, one or more host adapters 278 operate as the external interface to the system coupled to the cluster processor complex 280, which handles inputs and outputs coming from the one or more host adapters 278. The cluster processor complex 280 is connected to device adapters 282A and 282B, which connect the ranks 284A-E to the system that controls them. The ranks 284A-284E comprise the physical disks where the data is physically stored in the storage device 274A and which are accessed through one or more device adapters 282A, 282B coupled to the cluster processor complex 280. The ranks 284A-284E may be organized into one or more pools 286A, 286B under a given device adapter 282A. The described hardware architecture is only an example; those skilled in the art will understand that any number of different devices (e.g., controllers, host adapters, cluster processors, device adapters and physical disks comprising data volumes) may be coupled together in alternate architectures within the scope of the invention.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Algorithm Input and Output

A typical embodiment of the invention may be characterized as a programmed algorithm which operates to direct the storage of a data workload into the various volumes of a storage system. The algorithm requires a workload profile and certain performance measurements of each node as input information and generates a list of the volumes ranking the order that they should be applied to the workload as output information. For example, the inputs to the algorithm may comprise a workload profile and controller resource graphs (showing performance measures, e.g. throughput rates, for each node of the controller).

The workload profile can include information such as the total workload size to be stored (e.g., in GB) and a nominal cost value at each node. The nominal cost value is a measure of the increase in performance utilization experienced at a node per GB of the workload on any pool associated with the particular node. Any node is associated with all its descendant pools in the resource graph hierarchy.

The controller resource graphs describe the structure of the different storage controllers in the storage system. This structure may vary for different controllers depending on the controller design; different controllers have different numbers of components in the described hierarchy (or any alternate hierarchy). The particular performance numbers (e.g., the 100% utilization throughput rates) for different components of the system are also provided as an input to the algorithm.

In addition, a maximum and minimum permissible logical volume size may be identified. The maximum and minimum volume size constraint maybe as determined by the system administrator or through some other constraints applied in the system. It is probably not feasible to employ very small or very large volume sizes; small volume sizes may lead to excessive fragmentation and large volume sizes may result in imbalance in the system.

Figure 3:
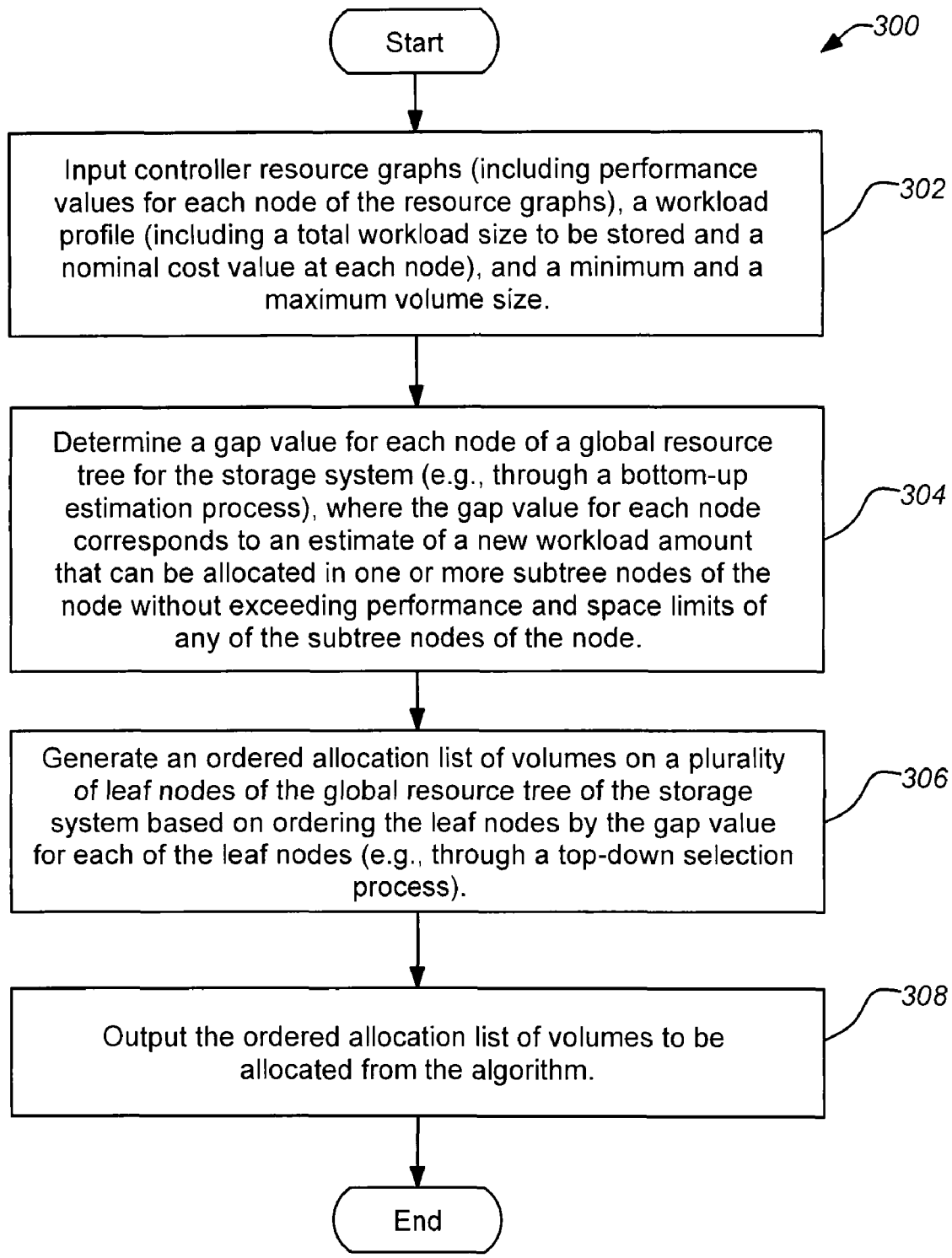
FIG. 3 is a flowchart of exemplary steps of a volume allocation algorithm embodiment of the invention.

FIG. 3 is a flowchart of exemplary steps of a volume allocation algorithm 300 embodiment of the invention. The algorithm 300 may be initiated in step 302 with an input of controller resource graphs (including performance values for each node of the resource graphs), a workload profile (including a total workload size to be stored and a nominal cost value at each node), and a minimum and a maximum volume size. In step 304 a gap value for each node of a global resource tree is determined for the storage system, through a bottom-up estimation process for example. The gap value for each node corresponds to an estimate of a new workload amount that can be allocated in one or more subtree nodes of the node without exceeding performance and space limits of any of the subtree nodes of the node. Next in step 306, an ordered allocation list of volumes on a plurality of leaf nodes of the global resource tree of the storage system is generated based on ordering the leaf nodes by the gap value for each of the leaf nodes, through a top-down selection process for example. Finally, in step 308 the ordered allocation list of volumes to be allocated may be output from the algorithm 300.

As described, embodiments of the invention can be implemented as an algorithm for scalable volume provisioning of new workloads on storage controller collections. A better balanced allocation can result without falling for the weaknesses associated with the other conventional storage allocation algorithms. Pseudocode for an example algorithm, which may be referenced as a Scalable Performance-based Volume Allocation (SPVA) algorithm, is provided here.

Input: Controller resource graphs; performance numbers at nodes

Input: Workload profile including Nominal Cost at each node and Required Space;

MinVolumeSize; MaxVolumeSize

Output: Ordered List of Volumes for allocation

```
Begin
1. Construct a global resource graph with controller graphs as sub trees
   and a single root node
2. For each node v
      Compute local TargetSpaceGap(v) or lgap(v)
      /* Any black-box node-specific calculation can be used */
3. Do a post-order traversal of the graph:
      compute childSum(v) = sum gap(u) over all children u of v
      compute gap(v) = min{lgap(v), childSum(v)};
      if (gap(v) < minVolumeSize) set gap(v) =0;
4. allocatedSpace = 0; allocList = { };
5. while (allocatedSpace < RequiredSpace &&
      gap(root) > RequiredSpace − allocatedSpace) do {
      v = root; found = false;
6. while (!found && gap(v) >= 0) do {
      if (v is a leaf node)
         L = min(ReqSpace−allocatedSpace, gap(v));
7.       L' = (L > MaxVSize) ? MaxVSize : ((L<MinVSize) ?
         MinVSize : L);
8.       Allocate a volume V of size L' on v;
         allocList += V; allocatedSpace += L'; found = true;
9.       UpdateGap( ) to update gap(.) numbers at all parents and
            ancestors;
      else
10.      Select a suitable child u of v
         set v = u and recursively repeat the inner while loop
         } /* inner while */
11. If (allocatedSpace < RequiredSpace) print "no allocation possible"
12. else return allocList;;
      end if;
```

After performing the bottom-up estimation and the top-down selection, the output of the invention is a list of volumes to be allocated. The objective of the algorithm is to provide an ordered list of volumes for allocation by distributing the workload among various components while maintaining balanced overall load across these components. Optimized placement of data into the pools can lead to increased performance utilization at higher levels too, as these higher levels also serve the data in the storage system. The bottom-up estimation and top-down selection processes of the foregoing example algorithm 300 will be further described in the following sections.

4. Bottom-Up Estimation Process

Figure 4:
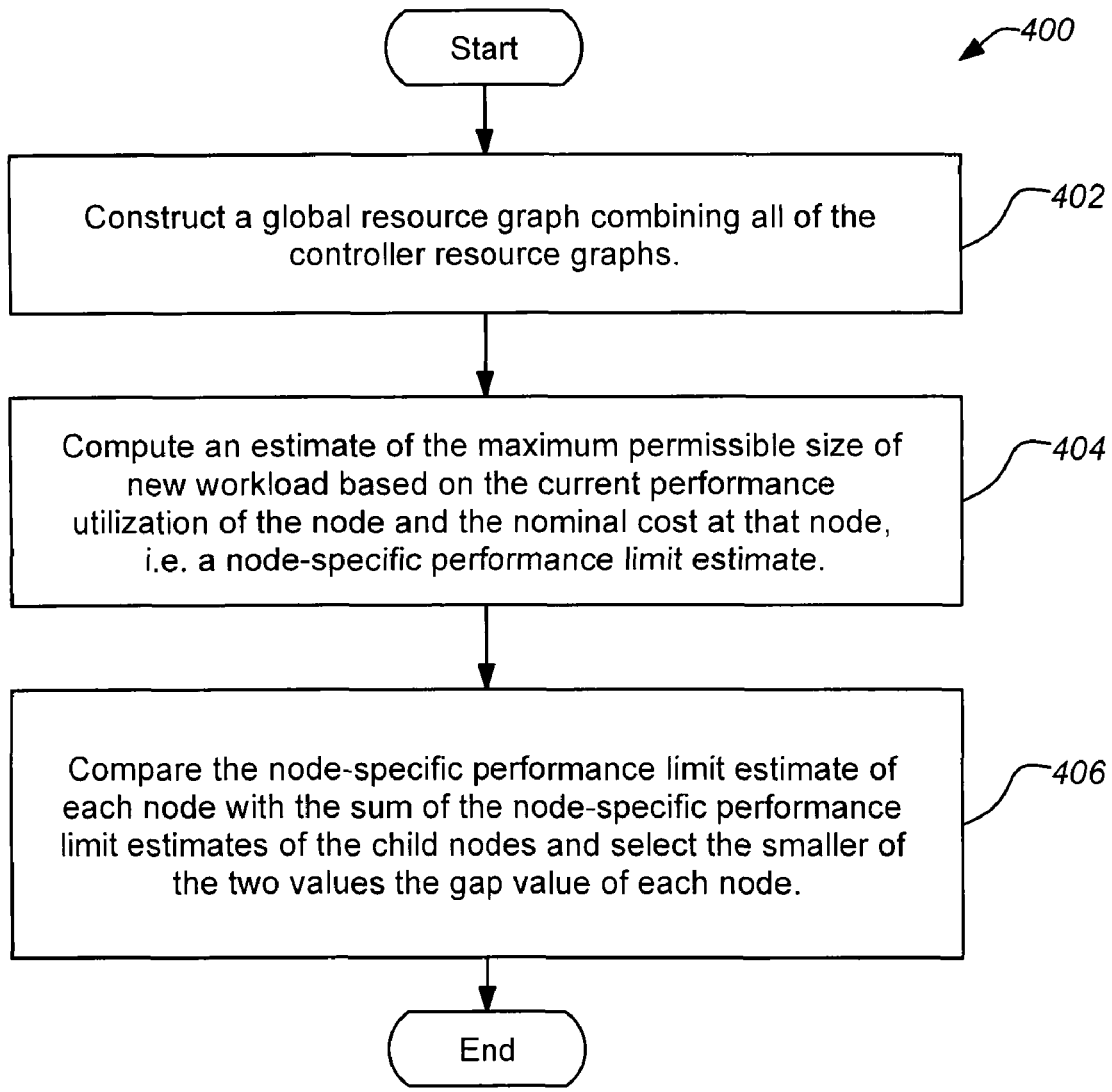
FIG. 4 is a flowchart of an example bottom-up estimation process.

FIG. 4 illustrates the bottom-up estimation process algorithm 400, which begins in step 402 with construction of a global resource graph by combining all of the controller resource graphs, which are given as inputs, under a single root node. This construction of a global resource graph permits a view of the entire storage system as a tree shaped structure with the resource graphs for different storage controllers as sub-trees. The algorithm operates on this global resource graph. In a tree shaped structure for displaying a hierarchy, the top of the tree is referred to as the "root" node, nodes stemming from a single node are referred to as the "children" of the single "parent" node, and at the bottom of the tree, the last nodes that have no child nodes are referred to as "leaf" nodes.

After the global resource graph is created, in step 404 the algorithm 400 computes an estimate of the maximum permissible size of new workload based on the current performance utilization of the node and the nominal cost at that node, i.e. a node-specific performance limit estimate. The algorithm denotes these initial node-specific performance limit estimates of all of the nodes in the graph as the lgap(v), where v is the node being measured. In other words, the lgap is how many gigabytes of workload a certain node is capable of handling.

Any suitable formula to determine the lgap may be used, however, the following formula is optimal for this algorithm:

```
lgap(v)= min{FreeSpace(v), (100-perfUtil(v))/nominalCost(v)}
if (lgap(v) < MinVSize) lgap(v) = 0;
```

This formula factors in the performance utilization of the node and the nominal cost of the node and allows for correction of the lgap based on the minimum permissible volume size. If the calculated lgap is unable to handle even the lowest volume size, then the value is set to zero, as it is not possible to set a volume size smaller than the minimum. This formula factors in the performance utilization of the node and the nominal cost of the node, where nominal cost represents how much percentage performance utilization will be incurred on this node if a 1 GB unit of the new workload were allocated there. The nominal cost can differ for disk adapters, clusters, ranks etc., depending on the relative IO throughput and bandwidth transfer going through those nodes. If the calculated lgap is insufficient to handle even the lowest volume size, then the value is set to zero, as it is not possible to set a volume size smaller than the minimum.

Once the lgap values are determined, a smoothing of the values can occur in step 406. The algorithm 400 can perform a post-order traversal for each node, comparing the lgap value of each node with the sum of the lgap values of the child nodes. The smaller of the two values is chosen, and is now referred to as the gap value of the node. For each node v in the resource graph, gap(v) is the amount in GB of new workload that can be put in sub tree of v without exceeding performance or space bounds at any of the nodes in the subtree of v. By this logic, the gap value of the root node of the global resource graph must be a good estimate of the total workload (in GB) that can be served in the system.

The post-order traversal comprises a systematic approach in which a tree structure can be processed, ensuring that all of the nodes are analyzed. The traversal starts at the root node of the tree and checks to see if the left node is a null value. If it is a null value, the right node is checked to see if it is a null value. If all children are null, the node is then visited. If the left child is not null, then post-order traversal is performed on the left node. Similarly, if the right node is not null, post-order traversal is performed on it as well. In all cases of post-order traversal, the left node is always checked first. In general, the sequence of operations in a post-order traversal is: left, right, visit—apply the traversal to the left node, apply traversal to the right node, and when those are completed, visit the current node.

5. Top-Down Selection Process

Figure 5:
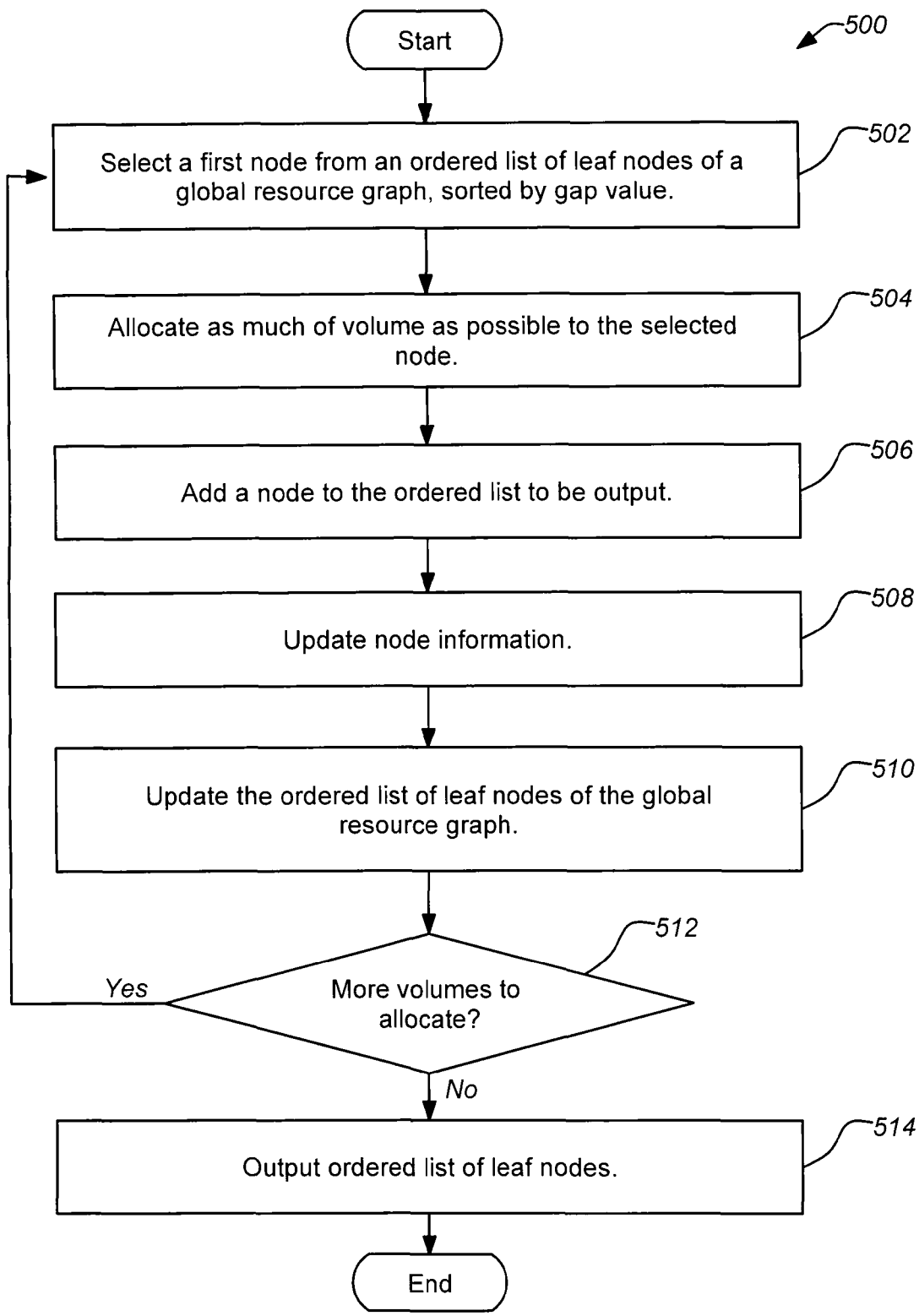
FIG. 5 is a flowchart of an example top-down selection process.

FIG. 5 illustrates a process that represents the top-down selection portion of an exemplary embodiment of the invention. The top-down selection algorithm 500 can begin in step 502 with a selection of the first node from an ordered list of leaf nodes, e.g., generated by the bottom-up estimation algorithm 400 of FIG. 4. This first node is the node with the highest gap value, able to handle the most workload. Once this node is selected, the algorithm 500 determines how much of the volume can be allocated to the leaf node. The gap value must be greater than the minimum permissible volume size and smaller than the maximum permissible volume size. If this is the case, in step 504 the algorithm allocates as much of the volume as possible to the selected node. In step 506, the volume to be allocated is added to the ordered list, which becomes the output of the algorithm. The variable keeping track of how much has been allocated so far is updated and the gap values for all nodes are updated as well. During this updating of the gap values, the list that keeps the nodes in a sorted order is also updated to reflect the gap values after allocation.

The overall algorithm performs this top-down selection recursively until there is either no more workload to be allocated, or until there are no more places to allocate them to. As mentioned previously, at the end of the process, the output of the algorithm is a list of volumes to be allocated.

An exemplary embodiment of the invention comprising both a bottom-up estimation process and a top-down selection process may be further described as follows. Reference is made to the example algorithm listed in section 3 above. After making the initial calculations, the algorithm can begin with the allocation process and recursively attempt to find suitable volumes to be allocated. Starting at the root level of the resource graph, the algorithm can traverse down the graph in an attempt to find a suitable child of v recursively. It is required that the children of v are maintained in a sorted order, ordered by decreasing gap(v) values. The algorithm selects the child with the highest gap(v) value. It should be noted that other schemes which permit user-defined cost functions or policy mechanisms, (i.e., depending on raid levels, etc.) can also be used to determine which child node to select. This process is performed recursively until the algorithm encounters a node at the leaf level of the global resource graph. In order to assign volumes at the leaf level, the algorithm determines a suitable volume size to be allocated at this leaf level. The volume size, as can be seen from the example algorithm, must be less than maximum permissible volume size and greater than minimum permissible volume size. The volume size must also be the minimum of the gap(v) value at the leaf node and the unallocated workload size (i.e., the Required Space less the Allocated Space).

Taking into consideration the foregoing constraints, the algorithm allocates a volume of size L' (e.g., as in step 8 of the example algorithm) on this leaf node (i.e., at the pool level). The allocated volume is then added to the ordered allocation list and the total allocated space is incremented by the size of the allocated volume. Note that the feasibility of this allocation is guaranteed by the calculations involved. The next step (e.g., step 9 of the example algorithm) involves updating of the gap(v) values. This may be accomplished using an UpdateGap( ) function (described below) after each successful allocation. The size of the allotted volume is used to recalculate the gap(v) values for each ancestor of the leaf node v selected in Step 6.

For each ancestor u of leaf node v, the example algorithm decrements the lgap value by the size of allocated volume (L'). The childSum of u is also decremented by the same value and newval is calculated as the minimum of lgap(u) and childSum(u). The example algorithm ensures that newval is not less minimum volume size (else it is set to zero) and assigns the value of newval as the new gap(u) value. The value of decrement is revised as a decrement equal to the gap(u) less newval for calculations at the higher level. The process is iteratively repeated until the updating has been performed at the root level. All gap values are successfully updated using this function. In order to maintain the ordering of nodes according to gap( ) values the UpdateGap( ) function below must perform appropriate reinsertions.

```
Function UpdateGap( )
    decrement = L';
    for successive ancestors u of v do {
        lgap(u) = lgap(u)−L';
        childSum(u) = childSum(u) − decrement;
        newval = min(lgap(u), childSum(u));
        if (newval < MinVSize) newval = 0;
        decrement = gap(u) − newval;
        gap(u) = newval;
    } /* repeat with parent(v)*/
```

The algorithm then repeats steps 5-10 until either it has allocated the required space or the algorithm determines that no new suitable volume can be allocated on the system.

Additionally, the user has the option of specifying the order for organizing the nodes. The default, as described in the specification so far, is for the algorithm to sort the nodes by decreasing gap values. However, if the user wishes to order them in some other manner, the order can be adjusted. The assumption in the pseudocode is that the values will be ordered according to decreasing gap values.

6. Estimated Performance Comparison with Existing Algorithms

FIGS. 6A to 6E compare an example embodiment of the invention, a Scalable Performance-based Volume-Allocation (SPVA) algorithm, against a conventional performance-based single controller algorithm (VPA), the greedy algorithm (which selects the best choice at the moment, leaving subsequent problems that may arise to be dealt with later), and the random algorithm (which as its name suggests, is random in its assignment of volume allocation).

Figure 6A:
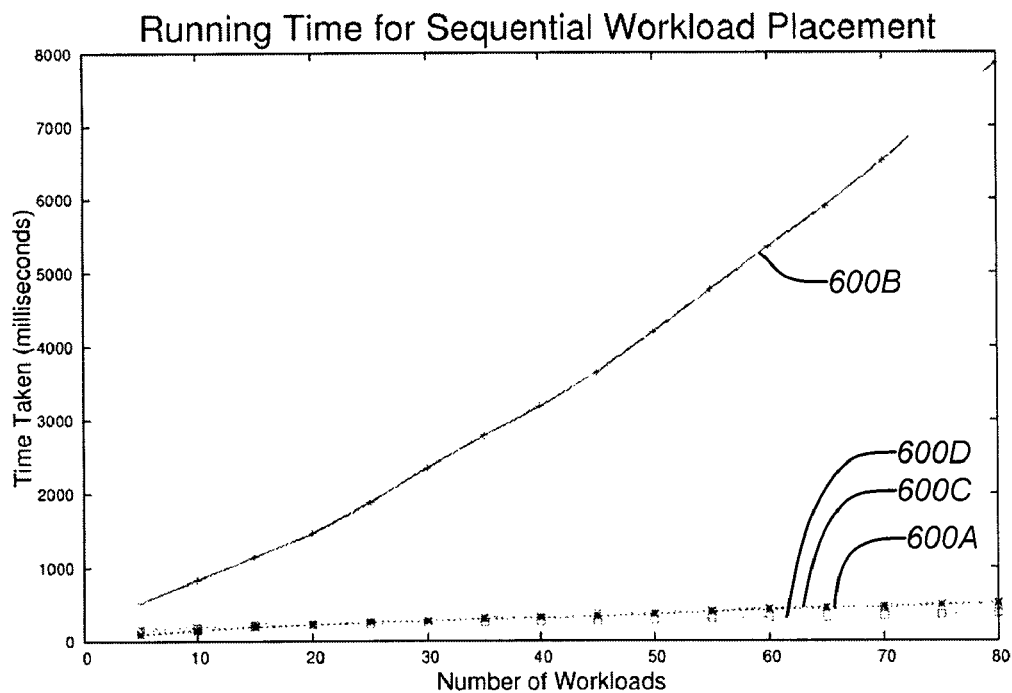
FIGS. 6A-6E are plots of various performance comparisons of an exemplary embodiment of the invention against other algorithms.
Figure 6B:
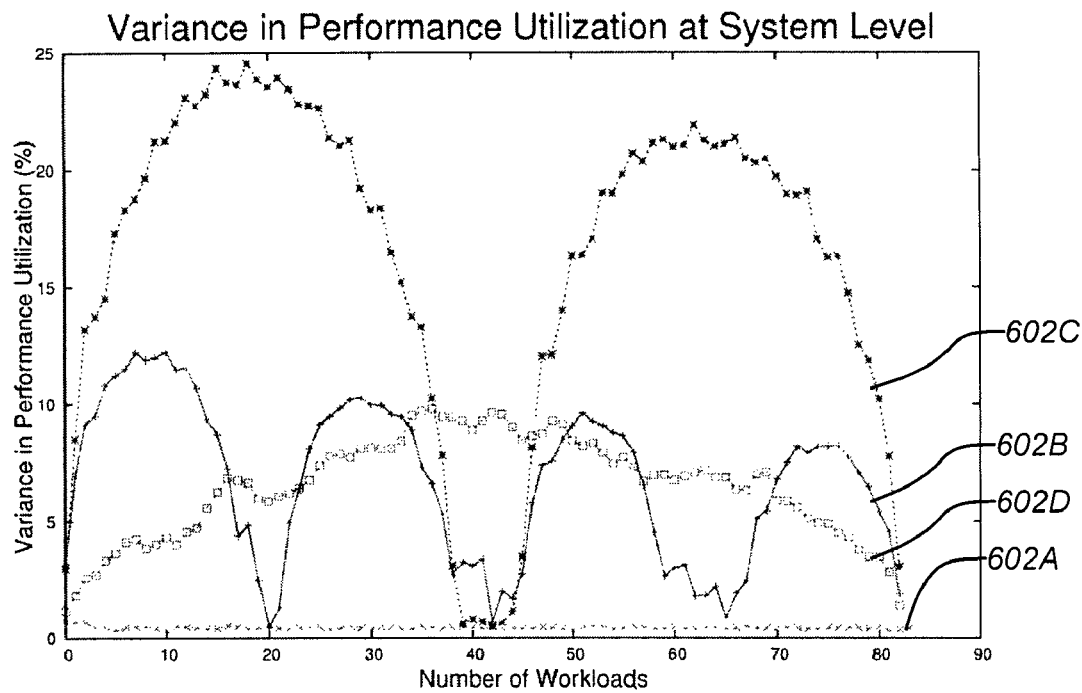
Figure 6C:
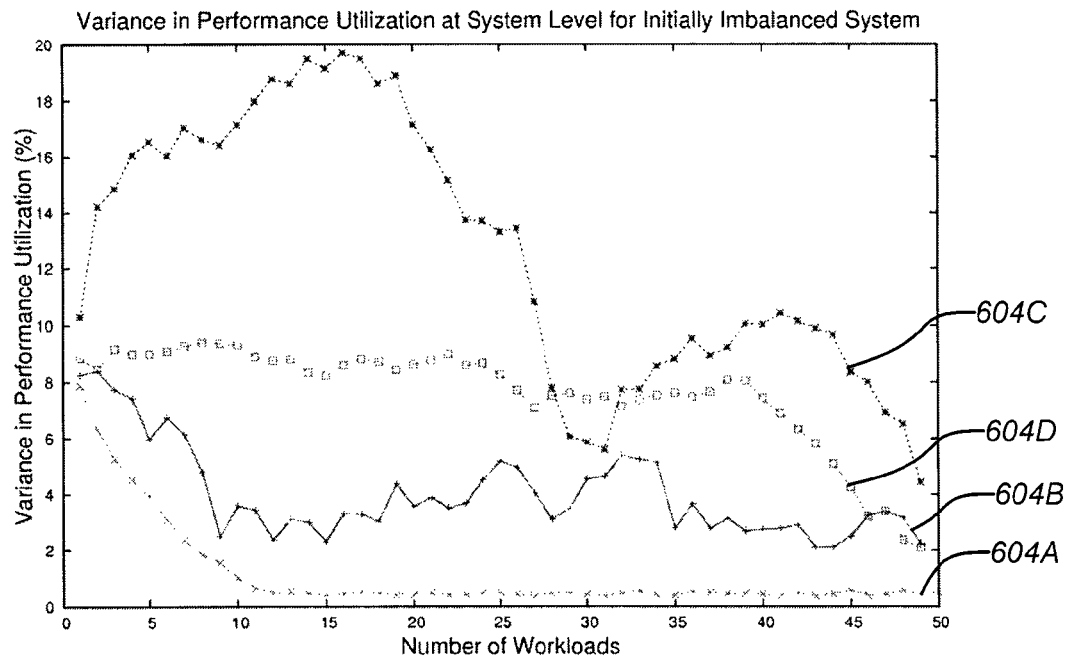
Figure 6D:
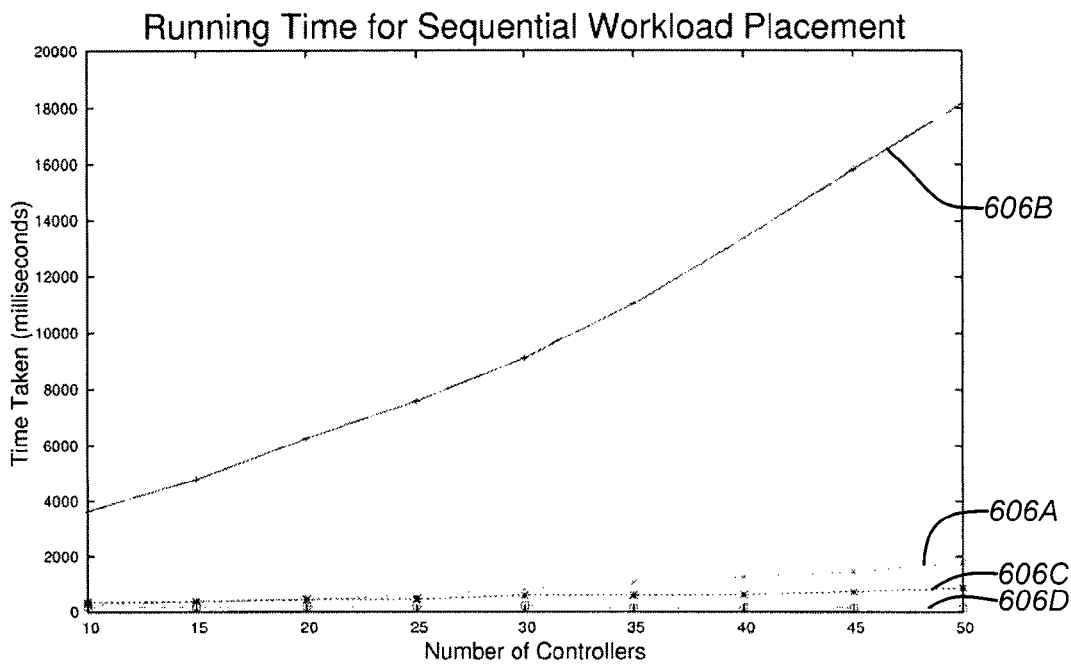
Figure 6E:
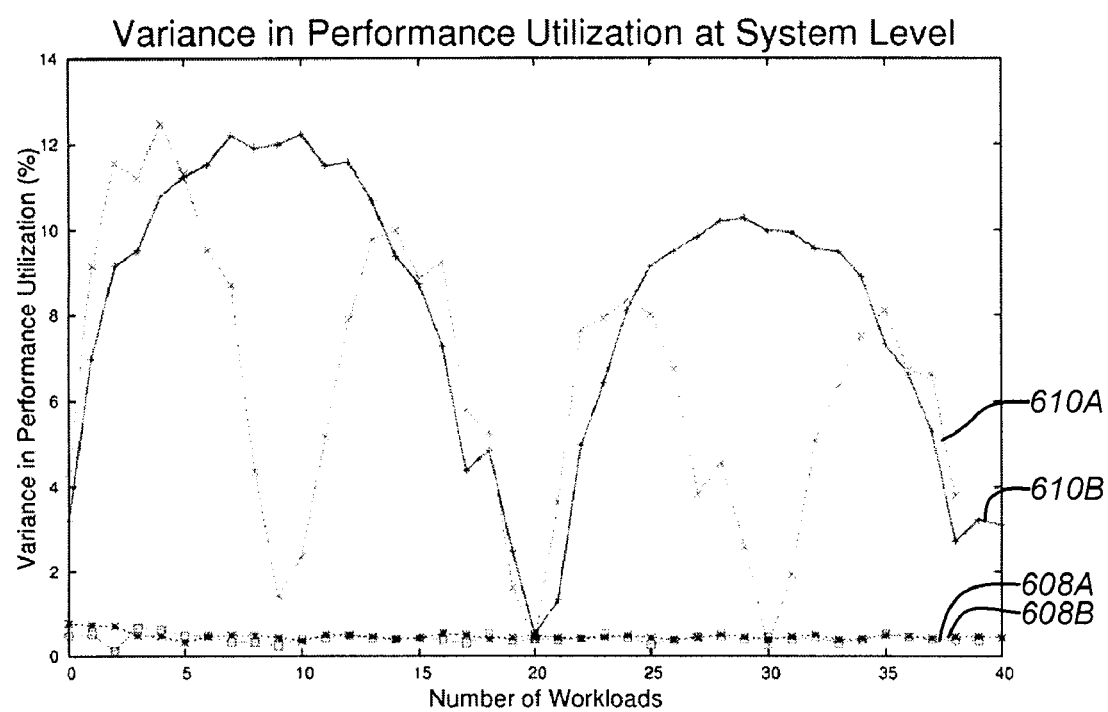

FIG. 6A compares the running time for sequential workload placement of the four algorithms, an exemplary SPVA algorithm 600A, a conventional VPA algorithm 600B, a greedy algorithm 600C and a random algorithm 600D. As number of workloads increases, the time taken to place the workloads is affected in only the conventional performance based single controller algorithm. FIG. 6B compares the variance in performance utilization at system level of the same four algorithms, the exemplary SPVA algorithm 602A, the conventional VPA algorithm 602B, the greedy algorithm 602C and the random algorithm 602D. The SPVA 602A is the only algorithm that is immune to variance despite increasing workload. FIG. 6C compares the variance in performance utilization at system level for an initially imbalanced system of the four algorithms, the exemplary SPVA algorithm 604A, the conventional VPA algorithm 604B, the greedy algorithm 604C and the random algorithm 604D. Again, as the workload increases, the variance remains high for all of the algorithms except the SPVA 604A. FIG. 6D compares the running time for sequential workload placement of the four algorithms, the exemplary SPVA algorithm 606A, the conventional VPA algorithm 606B, the greedy algorithm 606C and the random algorithm 606D. Much like FIG. 6A, the only algorithm affected by the increase in number of controllers was the VPA 606B. Finally, FIG. 6E compares the SPVA with 6 controllers 608A and 12 controllers 608B and the VPA with 6 controllers 610A and 12 controllers 610B. As shown, as the workloads increase, the variance in performance utilization at system level only affected the VPA with both 6 and 12 controllers. The SPVA at 6 and 12 controllers is substantially unaffected by the increase in number of workloads.

The variance in performance utilization at different levels in the resource graph hierarchy can be measured, particularly at the pool level (a lowest level in the hierarchy) and at the storage controller or system level (a higher level in the hierarchy). The load balancing properties may be observed for an initially balanced system and an initially unbalanced system.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:
   program instructions for determining a gap value for each node of a global resource tree for a storage system having a hierarchy of interconnected hardware elements in a plurality of component layers; and
   program instructions for generating an ordered allocation list of volumes on a plurality of leaf nodes of the global resource tree of the storage system based on ordering the leaf nodes by the gap value for each of the leaf nodes;
   wherein the global resources tree shows dependencies between the hierarchy of the interconnected storage components in the plurality of component layers as nodes of the storage system and the gap value for each node corresponds to an estimate of a new workload amount that can be allocated in one or more subtree nodes of the node without exceeding performance and space limits of any of the subtree nodes of the node.

2. The computer program of claim 1, wherein the gap value for each node is determined through a bottom-up estimation process across the global resource tree and the ordered allocation list of the volumes of the plurality of leaf nodes is generated from a top-down selection process.

3. The computer program of claim 1, further comprising program instructions for updating the gap values and reordering the ordered allocation list after allocating a workload to at least a portion of the ordered allocation list of volumes of the global resource tree.

4. The computer program of claim 1, wherein determining the gap value for each node comprises calculating a node-specific performance limit estimate.

5. The computer program of claim 4, wherein the node-specific performance limit estimate for each node comprises calculating a remaining performance capacity for each node; wherein the remaining performance capacity is determined from a remaining utilization value divided by a nominal cost for each node, where the nominal cost comprises a performance utilization rate per space used in any associated descendent volume for each node.

6. The computer program of claim 1, wherein the gap value for each node is determined as the lesser of the node-specific performance limit estimate for a parent node and a sum of the node-specific performance limit estimate for all child nodes for the parent node.

7. The computer program of claim 1, wherein any non-leaf child nodes of each node are processed in a sorted order by decreasing gap values of the non-leaf child nodes.

8. The computer program of claim 1, wherein any non-leaf child nodes of each node are processed in a sorted order by a user-defined cost function.

9. A method comprising the steps of:
   determining a gap value for each node of a global resource tree for a storage system having interconnected hardware elements in a plurality of component layers; and
   generating an ordered allocation list of volumes on a plurality of leaf nodes of the global resource tree of the storage system based on ordering the leaf nodes by the gap value for each of the leaf nodes;
   wherein the global resources tree shows dependencies between the hierarchy of the interconnected storage components in the plurality of component layers as nodes of the storage system and the gap value for each node corresponds to an estimate of a new workload amount that can be allocated in one or more subtree nodes of the node without exceeding performance and space limits of any of the subtree nodes of the node.

10. The method of claim 9, wherein the gap value for each node is determined through a bottom-up estimation process across the global resource tree and the ordered allocation list of the volumes of the plurality of leaf nodes is generated from a top-down selection process.

11. The method of claim 9, further comprising the steps of updating the gap values and reordering the ordered allocation list both after allocating a workload to at least a portion of the ordered allocation list of volumes of the global resource tree.

12. The method of claim 9, wherein determining the gap value for each node comprises calculating a node-specific performance limit estimate.

13. The method of claim 12, wherein the node-specific performance limit estimate for each node comprises calculating a remaining performance capacity for each node; wherein the remaining performance capacity is determined from a remaining utilization value divided by a nominal cost for each node, where the nominal cost comprises a performance utilization rate per space used in any associated descendent volume for each node.

14. The method of claim 9, wherein the gap value for each node is determined as the lesser of the node-specific performance limit estimate for a parent node and a sum of the node-specific performance limit estimate for all child nodes for the parent node.

15. The method of claim 9, wherein any non-leaf child nodes of each node are processed in a sorted order by decreasing gap values of the non-leaf child nodes.

16. The method of claim 9, wherein any non-leaf child nodes of each node are processed in a sorted order by a user-defined cost function.

17. A storage system, comprising:
   a hierarchy of interconnected storage components in a plurality of component layers represented as a global resource tree comprising a plurality of nodes corresponding to the different interconnected storage components for the storage system;
   a processor for determining a gap value for each node of the global resource tree and for generating an ordered allocation list of volumes on a plurality of leaf nodes of the global resource tree based on ordering the leaf nodes by the gap value for each of the leaf nodes;
   wherein the global resources tree shows dependencies between the hierarchy of the interconnected storage components in the plurality of component layers as nodes of the storage system and the gap value for each node corresponds to an estimate of a new workload amount that can be allocated in one or more subtree nodes of the node without exceeding performance and space limits of any of the subtree nodes of the node.

18. The storage system of claim 17, wherein the gap value for each node is determined through a bottom-up estimation process across the global resource tree and the ordered allocation list of the volumes of the plurality of leaf nodes is generated from a top-down selection process.

19. The storage system of claim 17, wherein determining the gap value for each node comprises calculating a node-specific performance limit estimate.

20. The storage system of claim 19, wherein the node-specific performance limit estimate for each node comprises calculating a remaining performance capacity for each node; wherein the remaining performance capacity is determined from a remaining utilization value divided by a nominal cost for each node, where the nominal cost comprises a performance utilization rate per space used in any associated descendent volume for each node.

* * * * *